(12) United States Patent
Kaever et al.

(10) Patent No.: US 7,721,675 B2
(45) Date of Patent: May 25, 2010

(54) METHOD FOR PROVIDING INFORMATION ON THE OCCUPANCY OF MILKING STATIONS OF A MILKING SYSTEM

(75) Inventors: Peter Kaever, Oelde (DE); Heinz Francke, Oelde (DE); Manfred Pohlkamp, Oelde (DE)

(73) Assignee: GEA Farm Technologies GmbH, Bonen (DE)

(*) Notice: Subject to any disclaimer, the term of this patent is extended or adjusted under 35 U.S.C. 154(b) by 342 days.

(21) Appl. No.: 10/576,973

(22) PCT Filed: Nov. 5, 2004

(86) PCT No.: PCT/EP2004/012534

§ 371 (c)(1),
(2), (4) Date: Jan. 3, 2007

(87) PCT Pub. No.: WO2005/043988

PCT Pub. Date: May 19, 2005

(65) Prior Publication Data

US 2007/0209594 A1 Sep. 13, 2007

(30) Foreign Application Priority Data

Nov. 7, 2003 (DE) .............................. 103 51 911

(51) Int. Cl.
*A01J 5/007* (2006.01)
(52) U.S. Cl. ................................ 119/14.08; 119/14.14
(58) Field of Classification Search ............... 119/14.02, 119/14.08, 14.14, 840, 721, 14.03, 908
See application file for complete search history.

(56) References Cited

U.S. PATENT DOCUMENTS

| 5,644,643 | A | * | 7/1997 | Scofield et al. | ............. | 382/110 |
| 5,653,192 | A | * | 8/1997 | Sheen et al. | ............. | 119/51.02 |
| 5,743,209 | A | * | 4/1998 | Bazin et al. | ............. | 119/14.08 |
| 5,959,526 | A | * | 9/1999 | Tucker | .................... | 340/572.1 |
| 6,104,294 | A | * | 8/2000 | Andersson et al. | ....... | 340/573.3 |

(Continued)

FOREIGN PATENT DOCUMENTS

DE        37 02 465 A1    8/1988

(Continued)

OTHER PUBLICATIONS

English language Translated Description and Claims of DE 37 02 465 A1, European Patent Office's esp@cenet.com database, 2pp.

(Continued)

*Primary Examiner*—Yvonne R. Abbott
(74) *Attorney, Agent, or Firm*—Smith Law Office

(57) ABSTRACT

The aim of the invention is to provide a method and a device for associating animals with milking stations. For this purpose, the animals are detected by sensors and subjected to identification processes, thereby providing information units for an individual animal. The detection by sensors and the identification processes are tuned with each other in such a manner that the respective sensorically detected data are associated with the data obtained by the identification processes. The latter represent animal-related information units that are made available at milking stations. The sensory detection can for example be carried out by photoelectric sensors.

6 Claims, 2 Drawing Sheets

U.S. PATENT DOCUMENTS

| | | | |
|---|---|---|---|
| 6,860,226 B2 * | 3/2005 | Nilsson | 119/14.02 |
| 7,234,414 B2 * | 6/2007 | Claycomb et al. | 119/14.02 |
| 7,263,948 B2 * | 9/2007 | Ericsson et al. | 119/14.18 |
| 2003/0140860 A1 * | 7/2003 | Guo | 119/14.02 |
| 2003/0154925 A1 * | 8/2003 | Van Den Berg et al. | 119/14.02 |
| 2006/0201432 A1 * | 9/2006 | Pratt | 119/51.02 |
| 2007/0022967 A1 * | 2/2007 | Doyle, II | 119/416 |
| 2007/0044732 A1 * | 3/2007 | Araki et al. | 119/721 |
| 2008/0236500 A1 * | 10/2008 | Hodges et al. | 119/14.02 |

FOREIGN PATENT DOCUMENTS

| | | |
|---|---|---|
| EP | 0 499 428 A1 | 8/1992 |
| EP | 0 898 883 A2 | 3/1999 |
| EP | 1 212 937 A1 | 6/2002 |
| EP | 1 340 457 A2 | 9/2003 |
| NL | 8903163 | 7/1991 |

OTHER PUBLICATIONS

English language Abstract of NL8903163, European Patent Office's esp@cenet.com database, 1p.
PCT/IB/338, Notification of Transmittal of Translation of the International Preliminary Report on Patentability dated Apr. 23, 2009, 1 p.
PCT/IB/373, International Preliminary Report on Patentability dated Apr. 23, 2009, 1p.
PCT/ISA/237, Written Opinion of the International Searching Authority dated Apr. 23, 2009, 3pp.

* cited by examiner

METHOD FOR PROVIDING INFORMATION ON THE OCCUPANCY OF MILKING STATIONS OF A MILKING SYSTEM

FIELD AND BACKGROUND OF THE INVENTION

The object of the invention refers to a method as well as to a device for providing information on the occupancy of milking stations of a milking system.

Although below the invention will be described with regard to the use of a milking system for the milking of cows, it will be pointed out that the method according to the invention or the device according to the invention for providing information on the occupancy of milking stations is also suitable for milking systems for the milking of other milk-producing animals, for example sheep, goats, donkeys, dromedaries, yaks, fillies, buffalo, horses and similar.

In the course of automation of milking as well as of the monitoring of animals with regard to their milk output and health, it is known that the animals are provided with an animal identification unit. The animal identification unit may contain various types of information about the particular animal.

For example, a system is known from EP 0 499 428 A1 with an entry which has an identification sensor in a frame. The identification sensor has a transmitting antenna and a receiver antenna for animal identification. The animal identification unit (for example, label) includes an electronic circuit, which is activated by a polling electrical high-frequency radiation (RF frequency) from the transmitter antenna and sends back an identification signal.

After performing an identification, an assignment is made to the milking stations from the sequence of identification of the animals.

The assignment of individual animals to the milking station presents a problem when an animal or a signal could not be received with the required quality, whether because the animal identification means was damaged or got lost.

This problem has already been recognized. A method is known for the correction of the assignment of animals to individual milking stations in EP 0 898 883 A1. For this purpose it is proposed that the expected amount of milk be determined based on historical milk measurements or those available in the past for the particular cows.

The amount of milk actually milked is compared with the expected amount of milk. If the amounts of milk at the particular milking stations do not agree, then a correction is performed by the shifting of at least one or several of the expected amounts of milk relative to the historical amounts of milk for at least one milking station number. If a historical amount of milk can be assigned to the actual amount of milk, then we have a cow identification.

The problem with this method is that a correction of the assignment is done only when the milking process has actually been performed and concluded. Especially in the case of animals whose milked milk must be separated, the correction is done at a point in time which is too late for separation of the milked milk. Moreover, there is a problem that the predicted amount of milk must be determined relatively accurately. If there are animals in an animal herd which give comparable amounts of milk, then unequivocal identification or assignment of the animals to milking stations cannot be done sufficiently so that a residual uncertainty remains.

The reliability of assignment of animals to milking stations can be increased by another method, by having the identification of an animal take place at the milking station itself. However, this involves increased expenditure for the installation and higher costs.

SUMMARY OF THE INVENTION

Based on this, the goal of the present invention is to provide a method for information about the occupancy of a milking station, by means of which an increased reliability of assignment of animals to milking stations is achieved. Another goal of the invention is to keep the technical as well as the economical expenses low, especially to create the possibility of using the method in existing milking systems.

In order to provide information about the occupancy of a milking station of a milking system, according to the method of the invention it is proposed that for each animal that visits the milking system an information unit be formed in each case for the individual animal. In order to form these information units, the animals are detected by a sensor in a sequence and are subjected to additional identification processes. The sensor detection and the identification processes are adjusted to one another in such a way that an assignment of the particular data detected by sensors and the data determined by the identification process of an information unit is possible. The sensor data and the data determined by the identification processes each form an information unit which is assigned to a given animal. The information units of the animals which are assigned to the individual animals are made available to the particular milking stations at which the animals belonging to the information units are located. By this procedure information about the occupancy of the individual milking stations is provided.

A process control is provided for the processing of the data. This can be part of a herd management system.

The data detected by the sensors may contain the ordinal numbers of the sequence in which the individual animals occupy the milking stations. Thus, for example, the first animal occupies a first milking station, the second animal a second milking station, a third animal a third milking station, etc. These data detected by sensors are assigned to the data determined during an identification process. For this purpose, during the identification process, the information on the individual animals is read from the animal identification means. If the identification process was successful, then, for example, the information unit of a first animal contains the ordinal number as well as the first individual information belonging to the first animal which were determined in the identification process. Hereby the first animal occupies the first milking station. The information unit thus formed is made available to this milking station. If during an identification process no data are determined for an animal, then this is also indicated in the information unit. An unsuccessful identification process can occur, for example, when the animal has no animal identification means, or if this is defective, or insufficient signal was received. Then no concrete information on the animal can be assigned to the information unit. Assignment to the milking station exists.

By conducting the process according to the invention in this way, two groups of information units or milking stations arise: the first group contains the milking stations with complete information units. The second group contains milking stations or information units in which sensory data exist but for which no correct identification of the animal occurred. The assignment of the information units to the individual milking stations nevertheless proceeds reliably, so that no "shifting" of the data occurs.

When a comparison is made of the data of a herd management system and the information units, then from this the number of animals can be determined for which no sensor data are available. These are the animals which were not recognized. The herd management system can provide data on the individual animals that were not recognized. The non-recognized animals can be indicated in the herd management system or with the aid of it. Preferably, the information units for which there was no correct animal identification are indicated in the milking parlor and/or at the milking station. To simplify handling, preferably a signal is produced at the milking station, especially a warning signal and/or a request to the operator to identify the animal located at the milking station. This procedure opens up the possibility for an operator to check if the identification means is damaged and/or missing. Optionally, the replacement of the identification means can also be performed at the milking station.

In a preferred further development, it is proposed that the sensor detector of the animals be done essentially before identification. The sensor detection of an animal can also provide a signal for triggering an identification process so that sensor detection of the animal as well as the identification process of the same animal soon follows. A very good synchronization between the sensor detection and identification of an animal is achieved by this preferred embodiment of the method. A reverse procedure is also possible.

The sensor detection can occur by optical means, especially by at least one photoelectric barrier or a camera system. The detection can also be achieved using sensors, especially approach sensors which trigger a signal when an animal approaches. The use of acoustic sensors or a scale or similar can also be provided. Detection of the temperature is also possible.

Other variations for performing the sensor detection of the animals are also possible, whereby it is essential that each animal be detected individually without it being necessary that the identification of the animal would have to occur at the same time. With the detection of the animals by sensor it is determined if an animal is present at all. As a rule, the identity cannot be determined in this way.

Alternatively, it is proposed that the sensor information be realized through another animal identification.

The sensor detection of the animals preferably occurs at an entry to the milking system. It is also possible to perform several sensor detections on the way to the milking system. In this way the direction of movement of an animal and possibly also its speed can be determined. This is especially advantageous when there is a danger that an animal already detected by a sensor can be detected again when it moves backwards. If the direction of movement of the animal is known, then an error correction can be performed or a deactivation of the sensor detection can be achieved when it is found that the animal moved backwards.

To carry out the identification processes of the individual animals, it is proposed that the animals pass through an identification area in succession. The identification process of an animal occurs in such a way that the individual information on the animal is read from information means that the animal carries, using an identification device. The identification means are means of any type that can be used for the identification of animals. These can be, for example, subcutaneous identification means, ear marks, neck and foot labels, as well as intelligent labels, for example for recognizing of the animal in heat, or using integrated sensors.

The method according to the invention is also suitable for automatic or semiautomatic milking systems, and preferably for robot-supported systems. It is provided preferably for conventional milking systems. These include especially group milking parlors, side-by-side milking parlors, herring-bone milking parlors or also milk carousels.

Another task of the present invention is to provide a device for providing information on the occupancy of milking stations which has a simple construction and especially which can be provided with low technical expenditure.

The device according to the invention for providing information about the occupancy of milking stations of a milking system has at least one identification device with the aid of which each animal is subjected to an identification process. With the identification process, the individual animals are identified, if this is possible. If identification is possible, then the individual data of the animal are read from the animal identification means which is carried by the particular animal. These data are stored in an information unit. If the particular animal could not be identified, this fact is also stored as information in the information unit.

At least one detection device is assigned to each identification unit. The detection device has at least one sensor. Each animal is detected with the aid of the detection device. In this way it does not matter whether the animal carries an identification means or not. The decisive thing is that the animal is detected as such. An information device is connected to the detection device and identification device using information technology. With the aid of this connection, the identification device sends signals to the information device. The detection device also sends a corresponding signal after detection of an animal to the information device. The information device makes information units available at least for the milking stations. The information units contain information which was obtained from the identification process of an animal as well as from the sensor detection of the animal.

With the aid of this device according to the invention, the possibility is created to represent the occupancy of the milking station of a milking system. In this way, the milking stations can be provided with the corresponding output units. The output unit preferably has optical and/or acoustical means.

With the aid of an optical output unit, an operator can read at each milking station which animal occupies the milking station. A prerequisite for this is that the identification process was successful. If this is not the case, then the person can be made aware optically and/or acoustically of the fact that the respective milking station is occupied by an animal which was not identified unequivocally. The alarms can also be transferred to a herd management system where they can be stored and processed.

The output of the information of the information device can also occur at a central location. Combinations are equally possible.

If an operator has been made aware of the fact that a milking station is occupied by an unidentified animal, then the operator can optionally decide about further proceedings. As long as the operator knows the animal or knows that information about the animal can be obtained from other sources, for example an earmark, the operator at the milking station can enter the missing identification information through a corresponding input unit.

However, the possibility also exists to preliminarily remove or separate the milked milk of an animal which was not identified, as a precautionary measure, using a control at the milking station.

If the device for providing information functions in cooperation with a herd management system, then, for example, a database can be made available to an operator containing characteristic properties of the individual animals. Using corresponding query algorithms, from the database it can be identified as to which animal occupied the milking station. Such an identification can also be simplified by the fact that in the database only the data of those animals are provided which have not yet been identified. This is expedient in the case of small herds or in cases in which the number of still undetected animals is small. Using optical systems, for example camera systems, image recognition methods or similar, the identification of an animal can be automated even further. Especially, a picture can be taken of each animal which was detected by the sensors of the detection device but which were not identified, and then this image will be assigned to the information units in order to make subsequent assignment possible.

The detection of the individual animals preferably occurs before an identification process is performed. For this purpose it is proposed that the detection device be pointed in the direction of the milking stations before the identification device is arranged.

The detection device has at least one sensor. Hereby we preferably deal with optical sensors. A sensor can also be a complex sensor system. Preferably the detection device is formed by at least one photoelectric barrier.

Every time an animal passes through the detection device, the photoelectric barrier yields a pulse. This pulse or signal activates a counter. The counter status corresponds to the ordinal number of the animal and this ordinal number is assigned to a milking station.

Since it never can be ensured that an animal will not go from a forward movement to a backward movement, a movement in the backward direction could under certain circumstances lead to erroneous interpretations and thus to inappropriate assignment of the animal to a milking station. In order to avoid this, it is proposed that at least two detection devices be provided which are arranged in the direction towards the milking stations one after the other. From the time displacement that is obtained from the speed of movement of the animal and the distance between the detection devices, the direction of movement of the animal can be determined. The distance between at least two detection devices should be sufficiently large.

The identification device is preferably an identification device which has a transmitting and/or receiving unit. The identification devices can be identification devices which are themselves already known.

In yet another advantageous embodiment of the invention it is proposed for the documentation of the processes that the information device have at least one memory unit.

Especially it is proposed that the information device be connected to a herd management system by information technology. As a result of this information exchange between the information and the herd management system can be established. Thus, in the herd management system other individual data of the animals can be deposited which are made available to the information device. Conversely, the information device can provide information to the herd management system. Especially information about animals or groups of animals which were not completely identified are deposited in the herd management system. In this way the herd management system can check, for example, if the animals are new acquisitions which have not yet been detected. There is also the possibility under certain circumstances after a milking process that the animals which were not identified be separated, in order to have these then equipped with the necessary animal identification devices. Optionally, defective animal identification devices can be repaired or replaced again.

It is of special advantage when the device is designed so that the information device is connected with a milking station control using information technology. This opens up the possibility of carrying out a milking process on animals which were not identified, whereby the milked milk of these animals is separated as a precaution.

The method according to the invention as well as the device according to the invention has numerous advantages. Especially, with the aid of the method according to the invention as well as with the device of the invention, it is achieved that unequivocal assignment of animals to milking station is provided. Moreover, information is provided about the milking station in which animals that have not yet been identified are located. Such information is available at a time before the milking process so that there is a possibility of taking appropriate measures without which the milked milk of the unidentified animals possibly could reach the usable milk, although this should be avoided.

Further details and advantages of the invention will be explained with the aid of the practical example shown in the drawing, without the invention being limited to the object of the drawing.

DETAILED DESCRIPTION OF THE PREFERRED EMBODIMENTS

Figure 1:
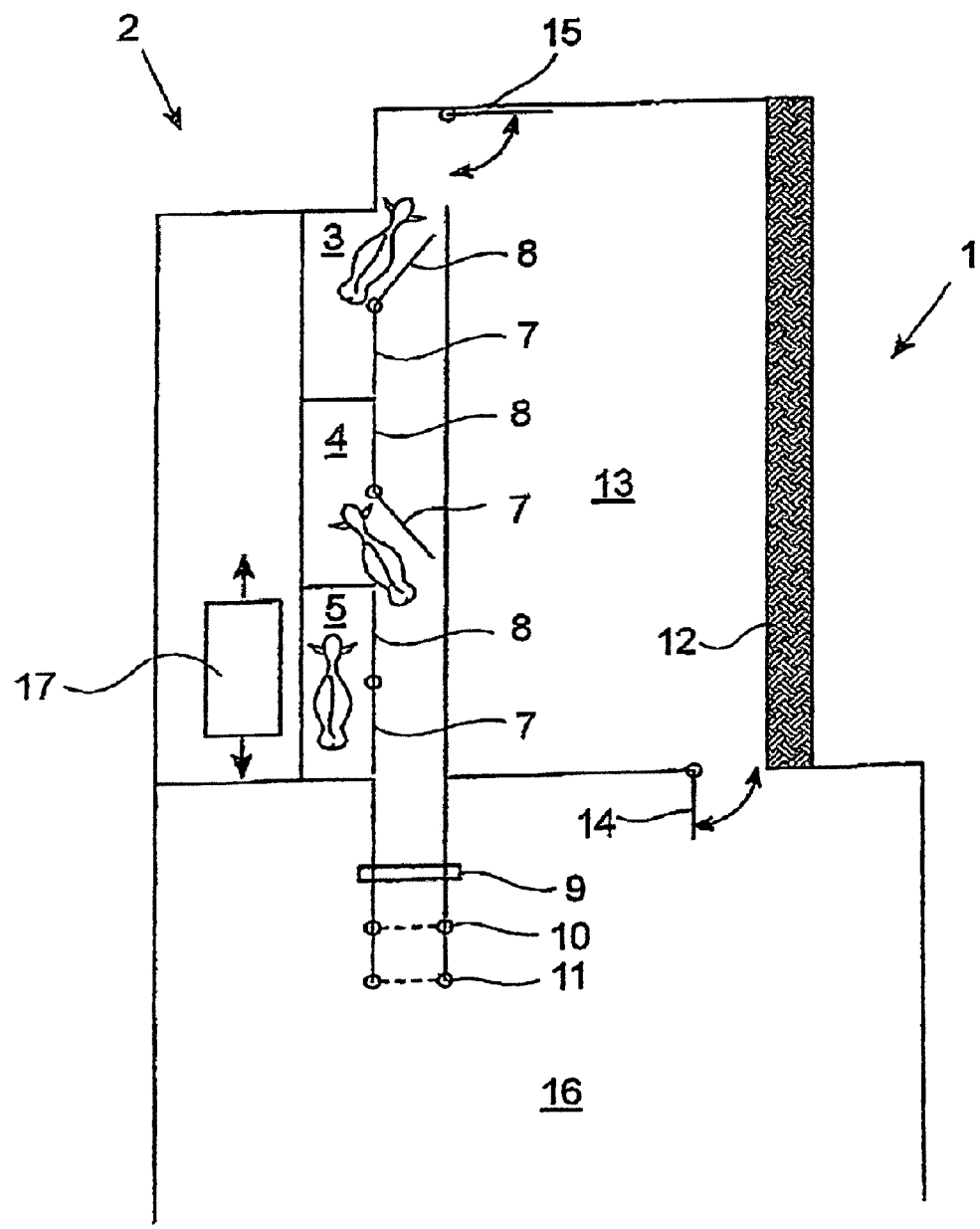
FIG. 1 is a schematic illustration of a stall arrangement with an identification device in accordance to with the present invention.

FIG. 1 shows a stall arrangement 1 with a milking room 2. The milking room 2 has milking stations 3, 4, 5 arranged in series. The milking stations 3, 4, 5 can be reached from a gangway 6 running parallel to the milking stations. Each milking station 3, 4, 5 has an entrance railing 7 and an exit railing 8. The gangway 6 is dimensioned so that animals following one another cannot overtake one another. Furthermore, the gangway 6 and the entrance railing 7 are dimensioned so that when the entrance railing 7 is open, the gangway 6 is blocked to the animal, so that the animal will necessarily be led to a milking situation. This situation is shown at milking station 4. On the other hand, the exit railing 8 is designed so that in the open position in which an animal can leave a milking station the animal can go along only a predetermined path.

At the entrance of gangway 6 an identification device 9 is arranged. With the aid of the identification device 9, the individual animals which go into gangway 6 in the direction of the milking stations, are always subjected to an identification process. The identification process 9 preferably works without contact. Specifically, it has a transmitting and/or receiving unit. With the aid of the identification unit 9, the animal identification means, in which characteristic quantities of individual animals or data are deposited and which are carried by the animals, are read.

Viewed in the direction of the milking stations, two recognition devices 10, 11 are arranged in front of the identification device 9. The recognition devices 10, 11 are arranged at a distance from one another. Preferably they have sensors which detect the animals moving in gangway 6 and in the direction of the milking stations. The recognition devices 10, 11 preferably have photoelectric barriers. The recognition devices 10, 11 detect the animals and assign to them, for example, an ordinal number. This ordinal number, together with the data obtained by the identification process, are assigned to an information unit. Since the milking station to which an animal arrives is known, the information unit is made available at least in this milking station.

After the completion of the milking process, the animals or the animal leave/leaves the milking room 2 and arrive/arrives at the feeding stations 12. For this purpose, a gate 15 at the end of gangway 6 is opened. The animals that are in the feeding station area 13, can leave it through a railing 14, which is opened and closed automatically, for example in order to go back to the bedding area 16.

Parallel to the milking stations 3, 4, 5, at least one milking robot 17 is arranged. In the practical example shown, the milking robot 17 can be moved in the longitudinal direction of milking stations 3, 4, 5.

The arrangement described above can be fundamentally transferred not only to milking-robot-supported systems. The identification device as well as the recognition device as well as their functional cooperation can also be realized in conventional milking systems as well as in semiautomatic milking systems. The possibility also exists that the inventive idea can be transferred to carousel milking installations or other milking installations with other moveable transport devices. The arrangement of the milking stations can be selected arbitrarily in a milking system. Hereby, it can, for example, be a side-by-side milking installation.

Figure 2:
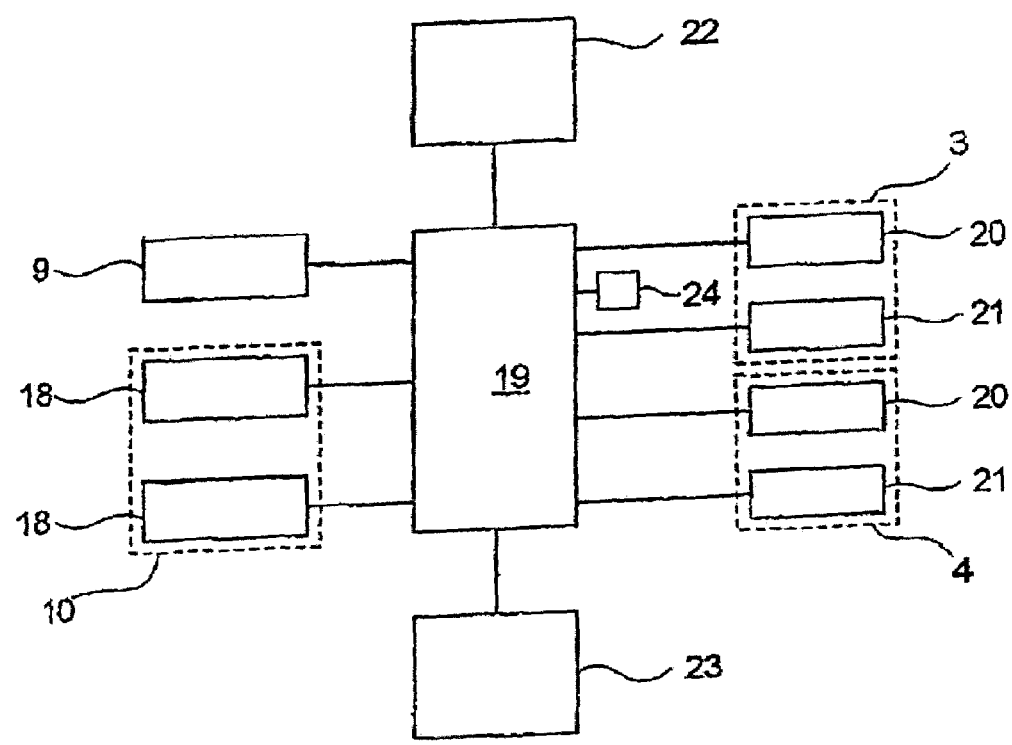
FIG. 2 shows schematically a device for providing information for the milking station occupancy of a milking system in accordance with the present invention.

FIG. 2 shows schematically and diagrammatically a device for providing information on the milking station occupancy of a milking system. The device has an identification device 9 and a detection device 10. The detection device 10 in the practical example shown is formed by two photoelectric barriers 18. The identification device 9 and the detection device 10 are connected to an information device 19 using information technology.

The identification device 9 provides signals to the information device 19, whereby the meaning content of the signal depends on whether an identification process was carried out successfully or was unsuccessful. If the identification process of an animal was carried out successfully, then the identification device 9 transmits the individual quantities or data belonging to the specific animal to the information device 19. If the identification process failed, which can occur, for example, due to the fact that an animal has no identification means, then a corresponding signal is transmitted to the information device 19. It is further possible that in this case no signal is transmitted from the identification device to the information device.

Before an identification process occurs in the identification device 9, detection of the animal in the detection device 10 occurs. The detection of the animal occurs with photoelectric barrier 18 in the practical example shown. The signals provided by the identification device 9 are assigned to the signal of the detection device, so that an information unit is formed for each animal.

Optionally the information device 19 is connected to a milking station 3 via a herd management system and, for example, milking control equipment. Optical and acoustic output units 20, 21 are arranged at milking station 3. The acoustic and optical output units 20, 21 can also be combined into one constructional unit and especially incorporated into existing equipment.

Furthermore, it can be seen from the representation in FIG. 2 that the information device 19 is connected to a herd management system 22. Exchange of information can take place between the information device 19 and the herd management system 22. Thus, for example, the information device 19 can request further data from the herd management system 22 on animals which were identified. Conversely, the information device 19 can provide data of the identified or not identified animals to the herd management system 22.

In order to document the milking station assignment, the information unit 19 is connected to a documenting unit 23. The documentation can be performed within the herd management system. The documentation can be provided, for example, in the form of a paper printout or on the monitor screen.

The information device 19 can also be connected to a milking station control device 24. Depending on the information content of the information units provided by the information device 19, the milking station control 24 can trigger different control processes. Hereby, for example, it can deal with the separation of the milked milk when it becomes known from the information content of the information unit that the milked animal has not been identified unequivocally. There is also the possibility that a marking device, not shown, is provided for example at the milking station, with the aid of which the unidentified animal is marked. The marking can be done, for example, in the form of color markings or other marking means so that the animal can be separated from the herd by an operator more easily when this animal is to be provided with an animal identification means. The milking station control can also be equipped in such a way that the unidentified animal is led to a separation area in order to be provided there with an animal recognition device.

With the aid of the design of the method as well as of the device according to the invention it is achieved that unequivocal assignment of the animals to milking stations is achieved in the front area of a milking process.

The invention claimed is:

1. A method for monitoring and identifying dairy animals, the method comprising the steps of:
   recognizing with a sensor the presence of dairy animals moving in a milking parlor comprising a number of milking stalls;
   assigning a number to each dairy animal, whereby the number corresponds to a stall in which the dairy animal will be milked;
   storing the number for each dairy animal in a process controller;
   conducting an identification step for each dairy animal with a sensor that interacts with an information storage device carried by the dairy animal to obtain identification data for that dairy animal;
   assigning the number and the identification data for each dairy animal to an information unit;
   making each information unit available at the stall in which the animal belonging to the information units is located;
   indicating stalls at which the information unit does not contain identification data; conducting a second identification step at the indicated stalls; and
   controlling a dairy operation in each stall corresponding to the identification data for the dairy animal in the stall.

2. The method of claim 1, and further comprising the step of:
   generating a signal when the step of conducting an identification step to obtain identification data for a dairy animal was not successful.

3. The method of claim 1, wherein the second identification step results from a signal being given to a dairy operator to visually identify the dairy animal when the step of conducting an identification step was not successful.

4. The method of claim 1, and further comprising the step of:
   determining the speed of the dairy animal moving in the milking parlor with a plurality of sensors.

5. The method of claim 1, and further comprising the step of:
   determining the direction the dairy animal is moving in the dairy parlor with a plurality of sensors.

6. The method of claim 1, and further comprising the step of:
   diverting milk from a dairy animal being milked when the step of conducting an identification step for that dairy animal was not successful.

* * * * *